United States Patent
Baglin et al.

(10) Patent No.: US 6,440,520 B1
(45) Date of Patent: Aug. 27, 2002

(54) PATTERNED MAGNETIC RECORDING DISK WITH SUBSTRATE PATTERNED BY ION IMPLANTATION

(75) Inventors: John Edward Eric Baglin, Morgan Hill; Mark Whitney Hart, San Jose; Andrew John Kellock, Sunnyvale; Bruce David Terris, Sunnyvale; Koichi Wago, Sunnyvale; Dieter Klaus Weller, San Jose; Liesl Folks, Los Gatos, all of CA (US)

(73) Assignees: International Business Machines Corporation, Armonk, NY (US); University of New Orleans Foundation, New Orleans, LA (US)

( * ) Notice: Subject to any disclaimer, the term of this patent is extended or adjusted under 35 U.S.C. 154(b) by 0 days.

(21) Appl. No.: 09/350,733

(22) Filed: Jul. 9, 1999

(51) Int. Cl.$^7$ ................................................ G11B 5/66
(52) U.S. Cl. .............................. 428/65.3; 428/694 SG; 428/694 TR; 428/694 BR; 428/141; 428/900; 427/128; 427/129; 427/130; 427/131
(58) Field of Search ......................... 428/65.3, 694 SG, 428/694 TR, 694 BR, 900, 141; 427/128–131

(56) References Cited

U.S. PATENT DOCUMENTS

| | | | |
|---|---|---|---|
| 4,935,278 A | 6/1990 | Krounbi et al. | 428/65.5 |
| 5,587,223 A | 12/1996 | White | 428/195 |
| 5,768,075 A | 6/1998 | Bar-Gadda | 360/135 |
| 5,820,769 A | 10/1998 | Chou | 216/22 |
| 6,153,281 A | * 11/2000 | Meyer et al. | 428/65.3 |

OTHER PUBLICATIONS

T. Ishida et al., "Discrete–Track Magnetic Disk Using Embossed Substrates", IEICE Trans. Fundamentals, vol. E76–A, No. 7, Jul. 1993, pp. 1161–1163.*
J. Bhardwaj, et al., "Advanced Silicon Etching Using High Density Plasmas", SPIE Proceedings, vol. 2639, Oct. 1995, pp. 224–233.*
E. EerNisse, "Compaction of Ion–Implanted Fused Silica", Journal of Applied Physics, vol. 45, No. 1, Jan. 1974, pp. 167–174.
A. Fernandez, et al., "Magnetic Force Micrscopy of Single–Domain Cobalt Dots Patterned Using Inteference Lithography," IEEE Transactions on Magnetics, vol. 32, No. 5, Sep. 1996, pp. 4472–4474.

* cited by examiner

Primary Examiner—Leszek Kiliman
(74) Attorney, Agent, or Firm—Thomas R. Berthold

(57) ABSTRACT

A method for making a patterned magnetic recording disk uses patterned ion implantation of the disk substrate. Energetic ions, such as He, N or Ar ions, are directed to the disk substrate through a mask, preferably a non-contact mask. They are implanted into the substrate, and the process causes localized topographic distortions in the substrate surface. A magnetic layer is then deposited over the substrate in the conventional manner, such as by sputtering. The result is a disk with patterned magnetic regions that are raised above the substrate surface. Because these regions are elevated, they are closer to the recording head in the disk drive and can thus be individually recorded to form discrete magnetic bits. Depending on the type of substrate used, the ion implantation can cause either localized swelling to form pillars or localized compaction to form pits. The patches of magnetic material on the tops of the pillars, or on the substrate surface between the pits, form the discrete magnetic bits.

23 Claims, 5 Drawing Sheets

PATTERNED MAGNETIC RECORDING DISK WITH SUBSTRATE PATTERNED BY ION IMPLANTATION

STATEMENT OF GOVERNMENT RIGHTS

The Government of the United States of America has rights in this invention pursuant to Contract No. MDA 972-97-1-003 awarded by the Defense Advanced Research Projects Agency.

TECHNICAL FIELD

This invention relates to magnetic recording media, more particularly rigid or hard disk media, wherein the magnetic recording material is patterned on the disk into discrete regions of single magnetic domains, each domain corresponding to the storage of a single data bit.

BACKGROUND OF THE INVENTION

Conventional hard disk drives typically use a continuous granular magnetic film as the recording medium. Each magnetic bit is comprised of many small magnetized grains. The difficulty in controlling the size, composition, and shape distribution of the grains in such media is compounded by the dichotomy associated with tuning the degree of magnetic coupling between the magnetic grains, i.e., weakening the magnetic coupling sharpens the transition between adjacent magnetic bits, while strengthening the magnetic coupling improves the recording characteristics of the individual magnetic bits.

The challenge of producing granular media will grow with the trend toward higher areal storage densities. Reducing the size of the magnetic bits while maintaining a satisfactory signal-to-noise ratio, for example, requires decreasing the size of the grains. Unfortunately, significantly reducing the size of weakly coupled magnetic grains will make their magnetization unstable (i.e., superparamagnetic) at normal operating temperatures. To postpone the arrival of this fundamental limit and to avert other difficulties associated with extending granular media, there has been renewed interest in patterned magnetic media.

With patterned media, the continuous granular magnetic film that covers the disk substrate is replaced by an array of spatially separated discrete magnetic regions, each of which serves as a single magnetic bit. Since this approach forcibly creates a well-defined boundary between adjacent bits, the problem of minimizing the transition width between adjacent bits is largely decoupled from the problem of optimizing the recording properties of the bits themselves. As a result of this increased latitude for bit design, each bit can be comprised of fewer and larger grains, the magnetic anisotropy of the grains can be increased, and the magnetic coupling between grains can be strengthened. These design tactics will likely push the onset of superparamagnetic behavior at normal operating temperatures to significantly higher areal densities.

The primary approach in the prior art for producing patterned media has been to selectively deposit or remove magnetic material from a magnetic layer on the substrate so that magnetic regions are isolated from one another and surrounded by areas of non-magnetic material. There are a variety of techniques for the selective deposition or removal of magnetic material from a substrate. In one technique the substrate is covered with a lithographically patterned resist material and a magnetic film is then vacuum deposited to blanket both the areas of resist and the areas of exposed substrate. The resist is then dissolved to lift off the magnetic film that covers it, leaving an array of isolated magnetic regions. An alternative technique is to first deposit a magnetic film on the substrate and then pattern resist material on the magnetic film itself. Magnetic material from the areas not protected by the resist can then be selectively removed by well-known processes. Examples of patterned magnetic media made with these types of lithographic processes are described in U.S. Pat. Nos. 5,587,223; 5,768,075 and 6,820,769.

From a manufacturing perspective, an undesirable aspect of the lithographic process is that it requires potentially disruptive processing with the magnetic media in place. Processes required for the effective removal of resists and for the reliable lift-off of fine metal features over large areas can damage the material left behind and therefore lower production yields. Also, these processes must leave a surface that is clean enough so that the magnetic read/write head supported on the air-bearing slider of the disk drive can fly over the disk surface at very low flying heights, typically below 30 nanometers (nm).

What is needed is a process of making a patterned magnetic recording disk that does not suffer from the disadvantages of the lithographic processes to selectively remove and/or deposit material on the substrate.

SUMMARY OF THE INVENTION

The invention is a method for making a patterned magnetic recording disk by patterned ion implantation of the disk substrate. Energetic ons, such as He, N or Ar ions, are directed to the disk substrate through a mask, preferably a non-contact mask. The ions implant into the substrate and the process causes localized topographic distortions in the substrate surface. A magnetic layer is then deposited over the substrate in the conventional manner, such as by sputtering. The result is a disk with patterned magnetic regions that are raised above the substrate surface. Because these regions are elevated, they are closer to the recording head in the disk drive and can thus be individually recorded to form discrete magnetic bits. In one embodiment the ion implantation causes localized expansion or swelling in the substrate material to form pillars that are elevated above the substrate surface. The patches of magnetic material on the tops of the pillars form the discrete magnetic bits.

In another embodiment the ion implantation causes localized compaction in the substrate material to form pits in the substrate surface. The magnetic material deposited in the regions between the pits is higher and thus serves as the discrete magnetic bits. In a variation of this embodiment, the disk is polished after the magnetic layer is formed to remove magnetic material in the regions between the pits, so that the resulting disk has a generally planar surface with the magnetic material formed only in the pits. The completed magnetic recording disk differs from prior art patterned magnetic recording disks because the substrate has localized topographic distortions relative to the rest of the substrate surface with these distortions containing concentrations of chemical species caused by the implanted ions that are not present in the regions of the substrate that have been masked from the ion irradiation.

In addition to being patterned with the individually recordable data bits for use as user data, the disk can also be patterned with magnetic bits that are used to later form discrete pre-recorded bits for servo tracking information and track and sector identification information.

For a fuller understanding of the nature and advantages of the present invention, reference should be made to the following detailed description taken together with the accompanying figures.

DESCRIPTION OF THE PREFERRED EMBODIMENTS

Figure 1:
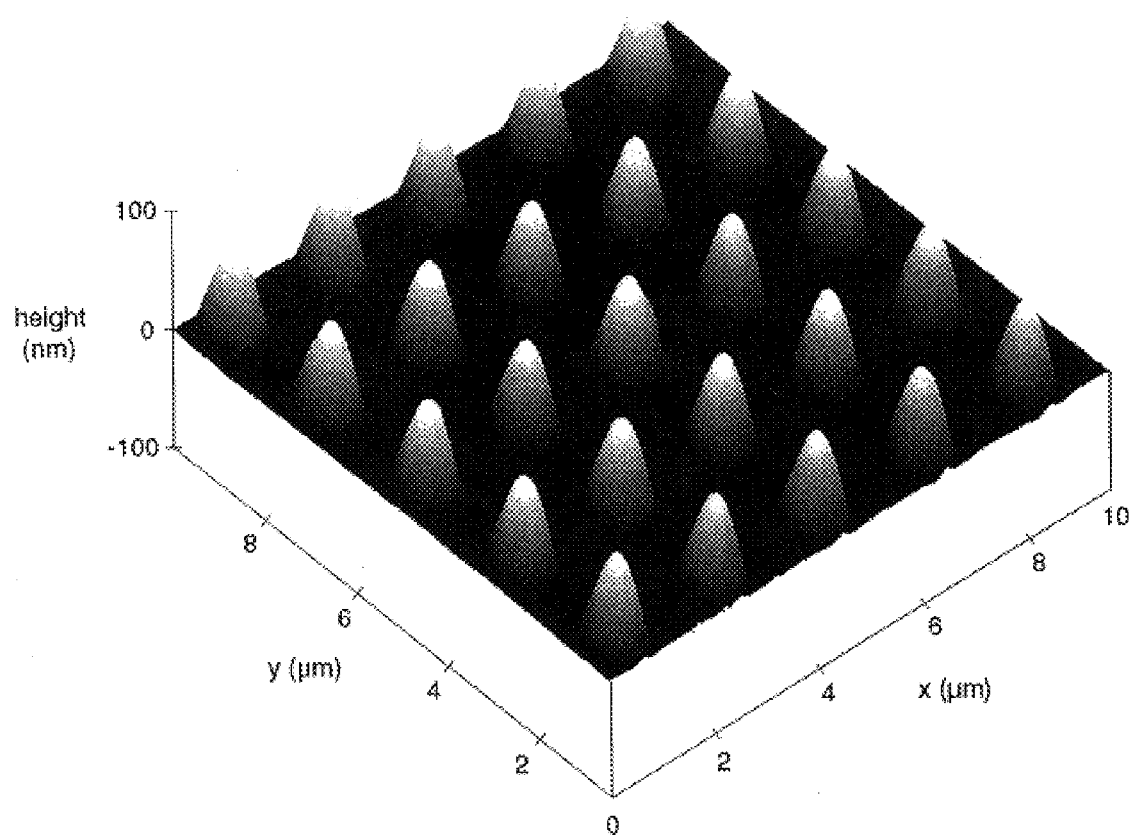
FIG. 1 is an atomic force microscope (AFM) topographic image of patterned 80 nm tall elevated regions or pillars on a silicon wafer coated with a 40 nm thick silicon nitride (SiN) layer.

The present invention is a process for making patterned magnetic media by topographically patterning the substrate. The surface of a suitable substrate is first given a well-defined, three-dimensional structure with discrete elevated regions. Referring first to FIG. 1 there is shown an atomic force microscope (AFM) image of patterned 80 nm tall elevated regions that were formed on a substrate of a single-crystal silicon wafer with a 40 nm thick silicon nitride (SiN) layer. The elevated regions were formed by Ar ion irradiation through a stencil mask. The ion dose was $10^{16}$/cm$^2$ and the energy was 1 MeV. The elevated features are 1 $\mu$m in diameter at the base and 1 $\mu$m apart. The elevated features are localized topographic distortions in the form of pillars that are formed by localized swelling or expansion of the silicon in the regions where the Ar ions pass through the SiN coating and implant into the silicon. The Ar ions damage the silicon and cause vacancies and disorder in the silicon lattice structure. The height of the localized distortions is controlled by the ion energy. Higher energy ions will stop deeper in the substrate, causing more swelling and thus higher pillars.

The stencil mask is a non-contact mask that comprises a wafer, such as silicon, with holes etched through it. The Ar ions are transmitted through the holes in the wafer. The silicon stencil mask was fabricated from a commercial silicon-on-insulator (SOI) wafer with a 10 $\mu$m-thick top side silicon layer, 0.5 $\mu$m of SOI oxide, and a 500 $\mu$m-thick silicon carrier substrate. The stencil holes were first patterned by optical lithography and then transferred into the 10 $\mu$m thick silicon layer by SF$_6$-based, high aspect ratio reactive ion etching (RIE) (J. K. Bhardwaj and H. Ashraf, Proc. SPIE 2639, 224 (1995)) with the SOI oxide serving as a reliable etch stop. Windows were then etched from the back side through the carrier substrate, using a similar RIE process, and the remaining SOI oxide was removed with a wet HF etch. The resulting silicon membrane is approximately 10 $\mu$m thick and covers an area of 1×1 mm. The holes in the membrane are nominally 1 $\mu$m in diameter, although somewhat irregular in shape, and are replicated throughout its area in a pattern that has sectors where spacing is varied from 1 to 10 $\mu$m. FIG. 1 shows the 1 $\mu$m spacing sector. In making the patterned media according to the present invention two such stencil masks were aligned with their holes overlapping to create holes with effective diameters in the range of 100 nm. However, in practice it is preferable to fabricate a single stencil mask in this manner, with much smaller holes in the sub-100 nm range, to produce patterned media with the desired areal density.

In the preferred embodiment the mask has holes formed in a pattern of concentric circles so as to form a magnetic recording disk with concentric tracks having discrete magnetic regions spaced along the tracks to serve as the individually recordable magnetic bits. The substrate patterned by ion implantation, as depicted in FIG. 1, thus has a generally planar surface with localized topographic distortions formed as pillars. The pillars contain a concentration of the ion species, e.g., N or Ar, that is not present in the other regions of the substrate.

Figure 2:
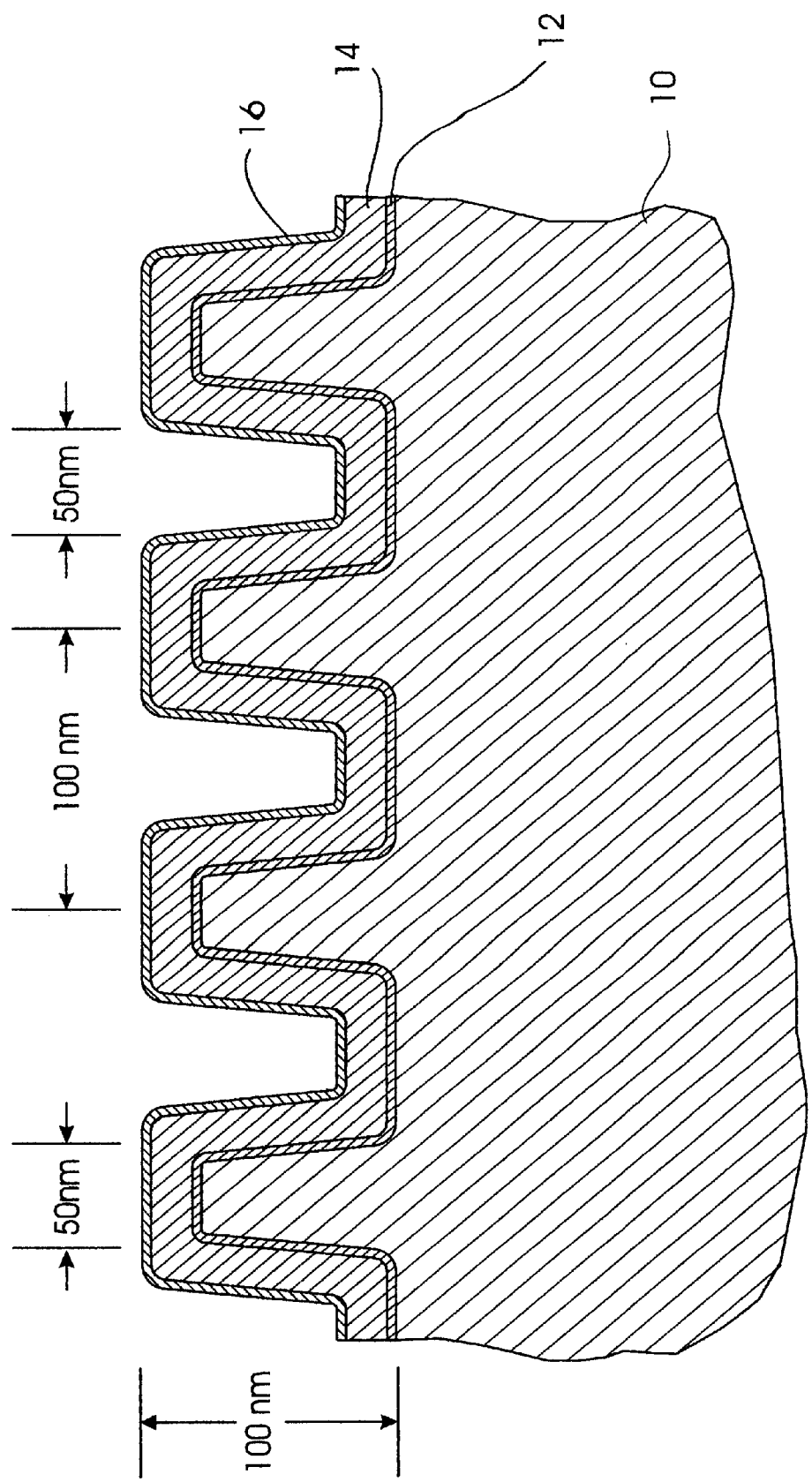
FIG. 2 is a sectional view of the disk fabricated with the substrate of FIG. 1 taken along a data track to illustrate the adjacent peaks and troughs and the various layers deposited on the substrate over the peaks and troughs.

After the substrate has been patterned, the conventional underlayer, magnetic layer and protective overcoat are sputter deposited onto it in the conventional manner. FIG. 2 is a sectional view of the completed disk with the conventional layers formed over the substrate taken along a data track to illustrate the adjacent peaks and troughs. The troughs correspond to the surface of the silicon substrate not implanted with the Ar ions. In FIG. 2, for example, the silicon substrate 10 (shown without the SiN layer) has a 20 Angstrom chromium (Cr) or chromium-vanadium (CrV) alloy underlayer 12 on it, a 100 Angstrom cobalt-platinum-chromium (CoPtCr) magnetic layer 14 over the underlayer 12, and a 50 Angstrom amorphous carbon protective overcoat 16 over the magnetic layer 14.

The magnetic material on and/or near the tops of the elevated regions or peaks of the structure of FIG. 2 will be closer to the read/write head than the magnetic material in and/or near the troughs or the substrate surface. Since it is known that the magnetic signal decreases very rapidly with increasing head/media spacing, the patches of magnetic material on adjacent peaks can be easily distinguished from each other and the patch of magnetic material on each peak can serve as a single magnetic bit.

Since only the patches of magnetic material on and/or near the peaks of the controlled surface topography serve as the magnetic bits, patches of magnetic material in and/or near the troughs or the substrate surface of the topography must not adversely influence the read/write head. This can be accomplished with an adequate amplitude or height difference spacing between the peaks and troughs. Also, because the magnetic material in the troughs does not contribute to the signal it is not necessary that there be continuous coverage of magnetic material in the troughs and on the walls of the pillars, so long as there is magnetic material formed on the tops of the pillars. The signal generated in the read/write head decreases with its vertical distance from the media as $\exp(-2\pi d/\lambda)$, where in this context, $\lambda$ is the lateral distance between adjacent peaks, and d is the vertical distance between the peaks and troughs. In a topography where the lateral area occupied by the peaks is equal to the lateral area occupied by the troughs, the heights of the peaks are equal to their width when $d=\lambda/2$. Under this condition, the signal from the troughs will be less than 1/20th of that from the peaks, and therefore the patches of magnetic material in the troughs will have little effect on the signal from the magnetic bits on the peaks.

The condition $d=\lambda/2$ with the above stated topography also satisfies another important consideration. To attain areal storage densities near 100 Gb/in², the lateral dimensions of the peaks and troughs must be near approximately 40 nm. Since methods known in the art for making a pillar-like structure of this lateral dimension become less reliable as the required height of the structure increases, it is desirable to use a topography with structures whose height is less than or comparable to their smallest width. For example, as shown in FIG. 2, the peaks have a height of approximately 40 nm and a width or lateral dimension at their base of approximately 40 nm, with the spacing between adjacent pillars being approximately 80 nm. With these approximate dimensions, and a track-center to track-center spacing of approximately 80 nm between adjacent tracks, an areal bit density can be achieved in the range of approximately 100 Gbits/in². The preferred height of the pillars is in the range of 10–100 nm.

In addition to silicon, other substrate materials that will experience localized expansion to form the pillars include crystalline materials, such as sapphire, and some amorphous materials. For example, 20 nm high pillars have been formed on a substrate of a substantially amorphous nickel-phosphorous (NiP) surface coating formed on an aluminum alloy by using a $10^{16}/cm^2$ dose of N+ions at 700 keV. While these pillars were formed through 1 $\mu$m holes for the purpose of demonstrating the phenomenon on other substrates, elevated features with smaller base dimensions are clearly possible. Essentially any ion species will work but the preferred ion species that can be used in addition to Ar and N include H, He, B, C, O and Ne. The ion species and energy will be chosen so as to govern the depth of penetration into the substrate and the rate of expansion per unit dose. In general, heavier ions will produce a larger effect per unit dose. However, the choice of ions will also be governed by the undesired surface sputtering loss that will result from low energy heavy ion bombardment.

It has also been discovered that the patterned disk having the structure shown in FIG. 2 can be fabricated with this same ion implantation process after the magnetic layer has been deposited. The Ar ions pass through the relatively thin magnetic layer and implant into the substrate, causing the same type of localized topographic distortions as when the ions strike the substrate directly. Thus, the present invention also provides the manufacturing flexibility of patterning the disk after one or more of the layers 12, 14, 16 has been deposited.

An additional advantage of the present invention is that this same patterning process can be used for the tracking servo information and other required information, such as sector and track identification information, which is typically permanently recorded using gray code. This information can be incorporated into the stencil mask and thus transferred to the substrate at the same time as the pattern for the recordable magnetic bits to be used for data. These servo and identification bits would then be pre-recorded on the disk.

Figure 3:
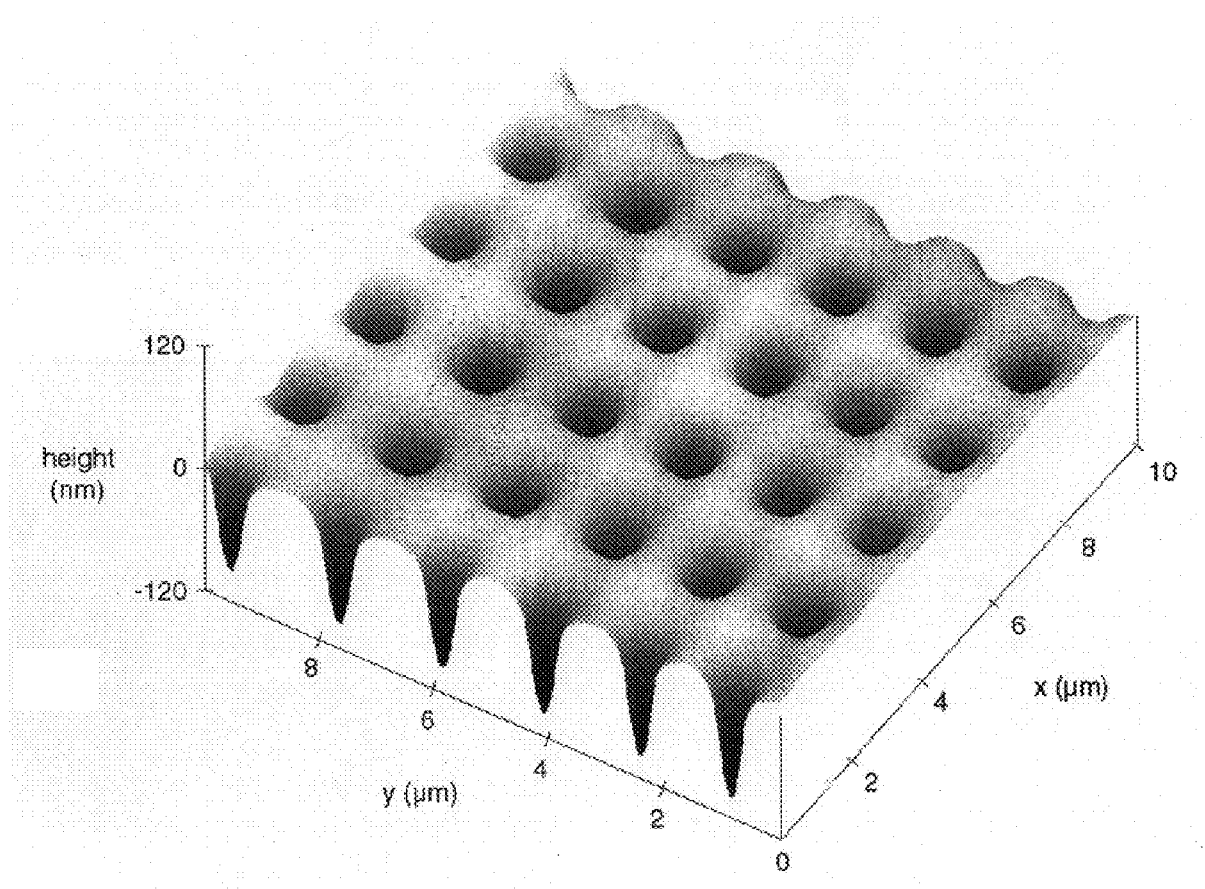
FIG. 3 is an AFM topographic image of patterned 40 nm deep depressed regions or pits on a fused silica substrate.

The process of ion irradiation through a non-contact patterned mask according to the present invention can also be used to form depressions instead of elevations in a substrate surface. FIG. 3 is an AFM image of patterned 40 nm deep depressed features or pits on a fused silica substrate. The pits were produced by He ion irradiation through a stencil mask. The ion dose was $5 \times 10^{16}/cm^2$ and the energy was 2.3 MeV. The features are 1 $\mu$m in diameter and 2 $\mu$m apart. The pits are localized topographic distortions formed by localized compaction or contraction of the fused silica in the regions where the He ions are implanted. The explanation for the cause of this compaction has been described in the literature, for example by EerNisse, "Compaction of ion-implanted fused silica", J. Appl. Phys., Vol. 45, No. 1, January 1974 (167–174).

Figure 4:
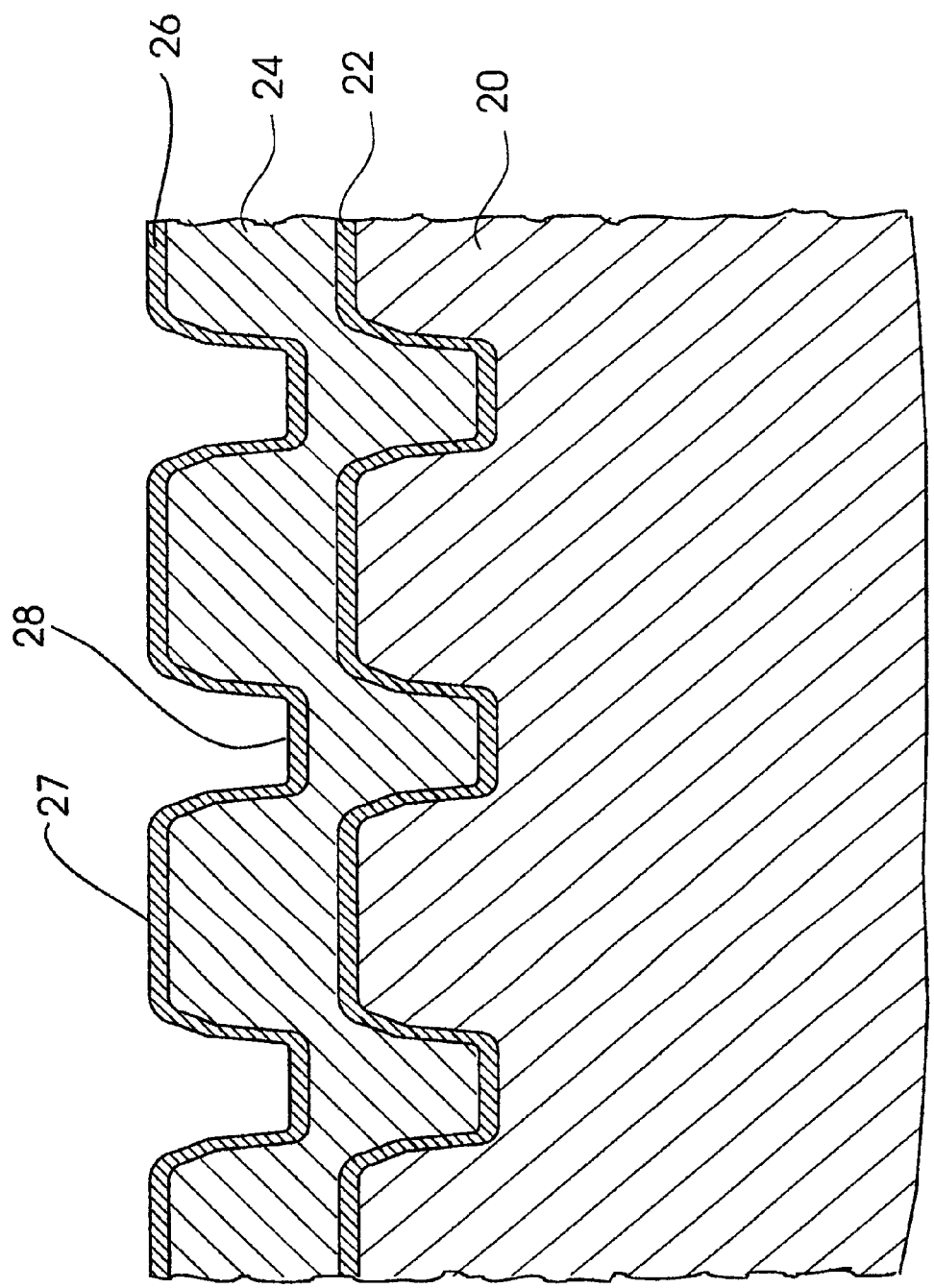
FIG. 4 is a sectional view of the disk fabricated with the substrate of FIG. 3 taken along a data track to illustrate the adjacent peaks and troughs and the various layers deposited on the substrate over the peaks and troughs.

Referring now to FIG. 4, after the substrate 20 of FIG. 3 has been patterned with the pits, the conventional underlayer 22, magnetic layer 24 and overcoat 26 are sputter deposited onto it in the conventional manner. This results in the patterned magnetic structure shown in FIG. 4, which is a sectional view taken along a data track. The patterned disk of FIG. 4 is similar to the disk shown in FIG. 2 because the spacing difference between the peaks 27 (the magnetic layer regions above the substrate surface regions where there are no pits) and the troughs 28 (the magnetic layer regions above the pits) is used as the mechanism for defining the patterned magnetic media.

Figure 5:
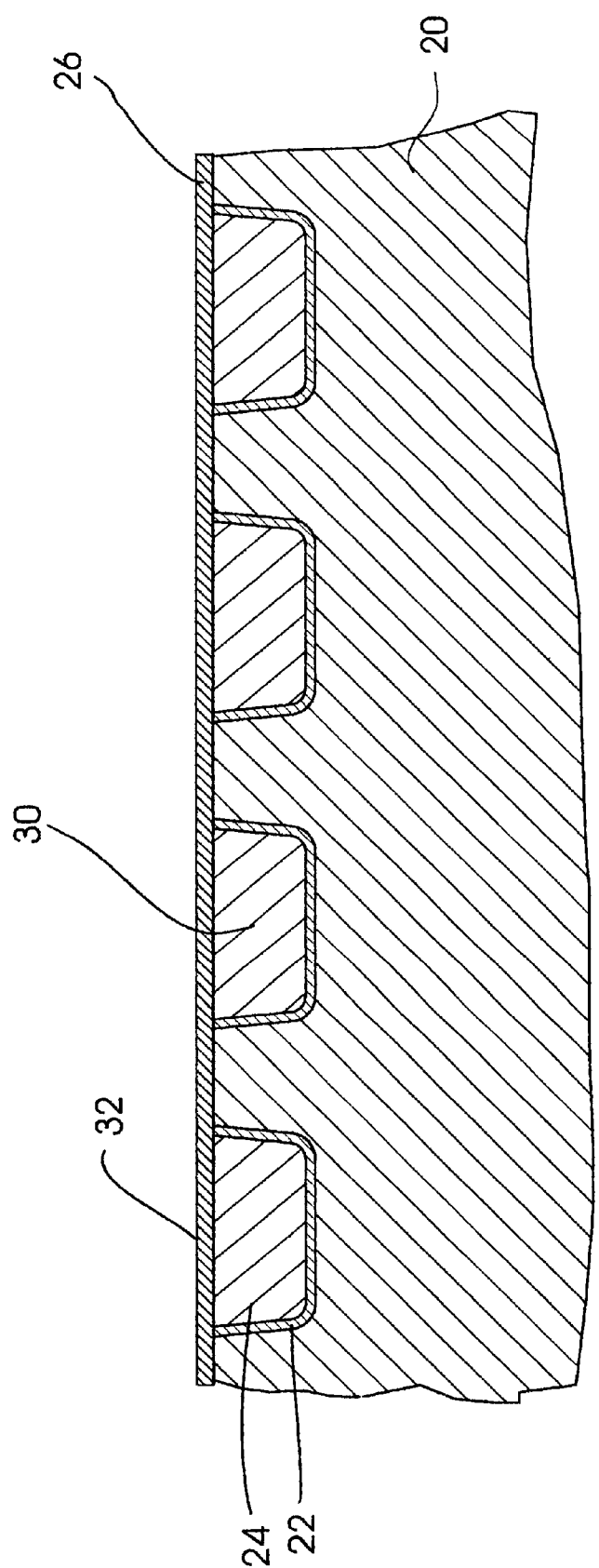
FIG. 5 is a sectional view of the disk fabricated with the substrate of FIG. 3 taken along a data track after polishing to remove the underlayer and magnetic layer and after deposition of a protective overcoat.

In addition, the substrate shown in FIG. 4, after it has been deposited with the underlayer 22 and magnetic layer 24 and without the deposition of overcoat 26, can be further processed to form a different type of patterned media. FIG. 5 is a sectional view of this disk taken along a data track showing the fused silica substrate 20, underlayer 22 and magnetic layer 24 after the structure has been polished. The material of the magnetic layer 24 is deposited to a thickness to completely fill the pits. In the fabrication of this embodiment of the patterned disk, the disk is polished, using a conventional chemical-mechanical polishing process, to remove the magnetic layer 24 and underlayer 22 down to the surface of the substrate 20, so that the magnetic material remains only in the pits. Then the conventional protective overcoat 26 is deposited over the disk, resulting in the completed structure. The disk of FIG. 5, unlike the embodiments of FIG. 2 and FIG. 4 (both of which utilize the magnetic spacing difference to define the patterned bits) relies instead on discrete magnetic regions 30 separated by discrete nonmagnetic regions 32 (i.e., the portions of the fused silica substrate between the pits). The lateral dimensions and spacing of the pits in FIG. 5 can be substantially the same as the lateral dimensions and spacings of the peaks of the pillars in FIG. 2. Ion beam patterning to produce pits in the substrate to form the disks of FIG. 4 and FIG. 5 results in fewer processing steps than would be required if conventional lithographic processing were used to form the pits.

The fused silica substrates used in the present invention were comprised of silicon oxide in an amorphous state (supersil). This form of silicon oxide has voids between some of the atoms. The silica can be transformed into a denser, and therefore more compact state, by slightly displacing the atoms so that they move closer together. This is achieved by the ion irradiation. Similar compaction will occur in some other amorphous, or glassy, materials, such as soda glass, microscope glass, and lead glass. Other ion species besides He that can be used include, B, C, N, O, Ne, Ar, subject to the same dose/species considerations as described previously for the patterning of the disk substrate to form pillars.

The preferred method for patterning the substrates with ion irradiation is by a non-contact mask, such as the silicon stencil mask described above. However, it is also possible to use conventional lithography, where a photoresist is formed on the substrate and patterned to expose openings aligned with the portions of the substrate that are intended to become the regions of localized distortion, i.e., the substrate pillars or pits.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a patterned magnetic recording disk comprising:

providing a substrate having a planar surface;

irradiating the substrate surface with ions directed through a patterned mask, the ions being implanted into the substrate to cause localized topographic distortions in the substrate surface; and depositing a layer of magnetic material over the ion-implanted substrate to form a pattern of discrete magnetic regions representing individual magnetic bits.

2. The method of claim 1 wherein the localized distortions are pits in the substrate surface caused by localized contraction of the substrate, wherein the magnetic layer is deposited to substantially fill the pits with magnetic material, and further comprising polishing the disk to make the surface of the magnetic material in the pits substantially coplanar with the surface of the substrate.

3. The method of claim 2 wherein the substrate is substantially fused silica.

4. The method of claim 2 wherein the substrate is substantially amorphous NiP.

5. The method of claim 1 wherein the localized distortions are pillars in the substrate surface caused by localized expansion of the substrate.

6. The method of claim 5 wherein the pillars have a height above the substrate surface of between 10 and 100 nanometers.

7. The method of claim 5 wherein the substrate is substantially single-crystal silicon.

8. The method of claim 1 wherein the mask is a non-contact mask.

9. The method of claim 1 wherein the ions are selected from the group consisting of H, He, B, C, N, O, Ne and Ar ions.

10. The method of claim 1 wherein the pattern of discrete magnetic regions is a pattern of generally concentric circular tracks.

11. The method of claim 1 further comprising depositing a nonmagnetic underlayer on the substrate before depositing the magnetic layer.

12. The method of claim 1 further comprising depositing a nonmagnetic protective overcoat over the magnetic layer.

13. A patterned magnetic recording disk comprising:

a substrate having a substantially planar surface with a pattern of localized topographic distortions in the substrate surface formed by localized implantation of ions into the substrate by ion irradiation; and a layer of magnetic material formed over the substrate.

14. The disk of claim 13 wherein the localized distortions are elevated pillars above the substrate surface.

15. The disk of claim 13 wherein the localized distortions are pits depressed below the substrate surface.

16. The disk of claim 15 wherein the magnetic material is formed substantially only in the pits, with substantially no magnetic material over the substrate surface in the regions between the pits.

17. The disk of claim 13 wherein the pattern of localized topographic distortions is a pattern of individually recordable magnetic bits arranged in generally concentric circular tracks.

18. The disk of claim 13 wherein the disk includes pre-recorded servo information and wherein the pattern of localized topographic distortions and the regions of the magnetic layer over said distortions form a pattern of prerecorded servo information.

19. The disk of claim 13 wherein the disk includes pre-recorded identification information and wherein the pattern of localized topographic distortions and the regions of the magnetic layer over said distortions form a pattern of prerecorded identification information.

20. The disk of claim 13 further comprising a nonmagnetic underlayer on the substrate between the substrate and the magnetic layer.

21. The disk of claim 13 further comprising a nonmagnetic protective overcoat over the magnetic layer.

22. The disk of claim 13 wherein the localized distortions include chemical species introduced by ion implantation and not present in other regions of the substrate.

23. A method for making a patterned magnetic recording disk comprising:

providing a substrate having a planar surface;

depositing a layer of magnetic material over the substrate surface; and irradiating the substrate surface with ions directed through a patterned mask and through the layer of magnetic material, the ions being implanted into the substrate to cause localized topographic distortions in the substrate surface to form a pattern of discrete regions in the overlying layer of magnetic material, said discrete regions representing individual magnetic bits.

* * * * *